H. N. BRAWNER, Jr.
EMULSIFYING APPARATUS.
APPLICATION FILED JAN. 31, 1911.

1,002,127.

Patented Aug. 29, 1911.

UNITED STATES PATENT OFFICE.

HENRY N. BRAWNER, JR., OF WASHINGTON, DISTRICT OF COLUMBIA.

EMULSIFYING APPARATUS.

1,002,127.  Specification of Letters Patent. Patented Aug. 29, 1911.

Application filed January 31, 1911. Serial No. 605,742.

*To all whom it may concern:*

Be it known that I, HENRY N. BRAWNER, Jr., a citizen of the United States, residing at Washington, in the District of Columbia, have invented certain new and useful Improvements in Emulsifying Apparatus, of which the following is a specification.

My invention relates to an emulsifying apparatus for liquids, such as milk or cream, which contain fat globules, and its object is to provide means for holding several members tightly together, between which milk or cream under pressure is caused to be forced or squeezed, the milk or cream being forced between the members under great pressure and at such a velocity as to change the condition of such milk or cream, as well as break up the fat globules or cells to such an extent as to homogenize the product and prevent the rising of the fatty constituents to the top of a body of the liquid.

The invention further consists in certain novel features of construction and combinations of parts which will be hereinafter fully described and pointed out in the claims.

Figure 1:
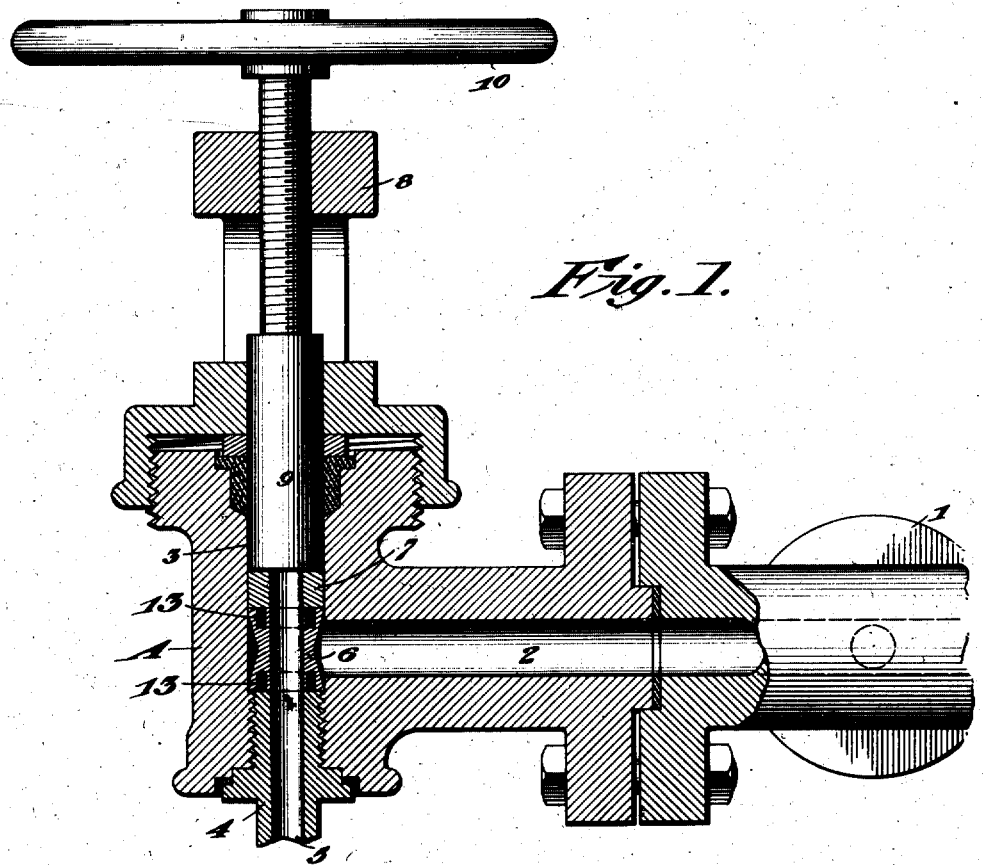
Figure 2:
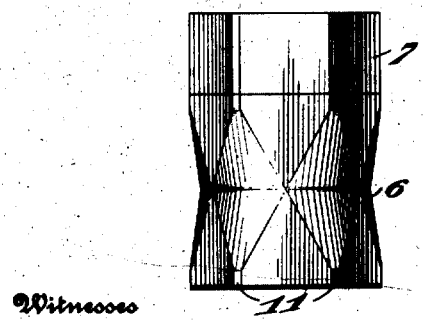
Figure 3:
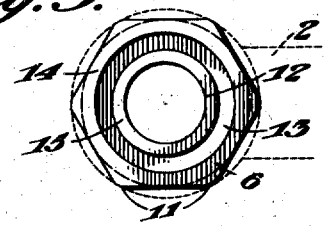

In the accompanying drawings, Figure 1 is a vertical sectional view of the apparatus showing the invention applied thereto; Fig. 2 is a view in side elevation of the invention, and Fig. 3 is a top plan view of the invention and showing the barrel of the apparatus in dotted lines.

A represents the barrel or casing of the apparatus, and 1 represents the pumps, the pumps delivering the liquid to the barrel through a passage or conduit 2 which is formed in the barrel and leading to the vertical bore 3 of the barrel. A bushing 4 is removably secured within the lower end of the bore of the barrel. The bushing has a bore 5 through which the emulsified or homogenized liquid is discharged. Mounted upon the upper end of the bushing 4 is a plug 6, and mounted upon the plug 6 is a disk or washer 7. A support 8 is mounted upon the barrel or casing, and a plunger 9 has screw-threaded engagement therewith, one end of the plunger engaging the upper surface of the washer or disk 7. A wheel 10 is mounted upon the upper end of the plunger for forcing the plunger against the washer 7 for compressing the washer against the plug 6 and the plug against the bushing 4.

The plug 6 and the washer 7 are preferably made in the form of a hexagon, the edges 11 of the washer and plug engaging the bore of the barrel A for holding them in their particular relation to each other. The plug has its edges 11 preferably made convex or beveled inwardly toward the center of the plug for forming an annular passage entirely around the centr portion of the plug. This annular passage is in direct alinement with the flowing liquid, which is delivered from the pump through the conduit 3. The liquid, as it comes into the bore of the barrel A, will surround the plug, and as it is under pressure (from fifteen hundred to two thousand pounds) it will be caused to travel upwardly and downwardly along the plug over the flat surfaces of the plug, and as the liquid is under great pressure, it will be caused to pass between the plug and the bushing 4 and the washer 7, and be discharged through the bore 12 of the plug and the bore 5 of the bushing. At each end of the plug, a circumferential groove 13 is formed which acts as a well. The object of this well is to present two flat surfaces over which the liquid must pass before reaching the bore of the plug. The upper end of the bushing 4, and both ends of the plug 6, as well as the faces of the washer 7, are ground smooth, so that when the liquid is forced into the barrel, it will travel along the plug and be forced between plug, bushing and washer, due to the great pressure under which the milk or cream is supplied to the barrel. As the milk or cream passes over the first edge 14 of the barrel, it will be deposited into the well or circumferential groove 13 at each end of the plug, and will thence pass over the second edge or annular surface 15 of the plug, and thence through the bore of the plug and bushing. The milk or cream so treated will be in such emulsified or homogenized or changed condition that it will not curdle in coffee, the reason for this being that the fat globules or cells have been completely broken up and otherwise changed, due to the heavy compression which is brought to bear upon the plug, bushing and washer, and between which members the liquid is forced or squeezed under great pressure, and at a high velocity. The liquid is caused to impinge upon the surface of the members which will cause the disintegration of the fat globules and otherwise change the constituency of the liquid. On account of the fact that the liquid surrounds the plug and is caused to pass across the entire annular surface of the plug to the bore of the plug, the liquid, as it passes over the annular surface 15, will all be brought together as the liquid passes into the bores of the plug and bushing, and as the liquid enters the bores, an impact will be caused as the liquid again comes into a solid body, whereby the fat cells will be broken, if any remain after having passed over the annular surfaces 14 and 15 of the ends of the plug, and the flat surfaces of the bushing and washer. Devices have been provided in an attempt to produce this result, but so far as I am aware, they have not been satisfactory, nor can they meet the requirements.

A device has been produced by one Willmann in which is provided a plurality of disks which are provided on their surfaces with circumferential grooves and radial grooves, certain of the radial grooves leading from the outer edges of the disks to the circumferential grooves, and then other radial grooves leading from the circumferential grooves to the bore of the disk, the two sets of grooves being out of alinement. I have experimented with this form of invention, but have found it unsatisfactory for the reason that the milk or cream which is forced between these disks requires a pressure of from 4,000 to 6,000 pounds; and when the emulsified product is discharged from the apparatus, it is not in the proper condition which it should be when properly treated. The milk or cream, when used in coffee, will curdle. This should not be the case, and I have found from experiments with the invention, as above described, that I can produce the desired results by forcing or squeezing the milk or cream between a plug, bushing and washer by providing the surfaces of these parts smooth, and without any grooved formations thereon. This causes a smooth, flat stream to be discharged from the annular edges of these members into the bores of the plug and bushing, and thereby does away with the minute streams which are discharged in the Willmann idea. He relies upon the impact for breaking the fat globules, which impact is created by the minute streams coming in contact with the surface of the circumferential groove, and when the streams come together at the bore of the disks. With my invention, the fat globules or cells are broken by the squeezing or forcing of the milk or cream between flat surfaces, and the impact of the milk as it passes over the flat surfaces commingles in the bores of the bushing and plug, forming an emulsified or homogenized product. The pressure which is brought to bear upon the plug, washer and bushing is regulated by the plunger 9. As these members are compressed, a greater pressure is obtained by the milk or cream in forcing or squeezing it through or between these members, but in obtaining the best results with my invention, I have only been required to use from 1,500 to 2,000 pounds pressure, which is naturally a great saving in the power required for operating the apparatus.

From the foregoing, it will be seen that the liquid is caused to pass between the bushing and one end of the plug, and between the other end of the plug and the washer, and between the washer and the plunger, so that three openings or spaces are formed through which the liquid can be squeezed for breaking the fat cells; and after the liquid has passed over the flat surfaces of these members, it will pass down through the bore of the washer, plug and bushing, and be conducted therefrom to any suitable receptacle.

Having fully described my invention, what I claim as new and desire to secure by Letters Patent, is:—

1. An emulsifying or homogenizing apparatus comprising a barrel having an opening for the admission of liquid to the bore thereof, a hollow plug mounted in the bore of the barrel, means engaging the ends of the plug and confining the plug within the barrel under pressure, said plug having the ends thereof smooth, and passages formed on the body of the plug for conducting the liquid to the ends of the plug where it is squeezed between the ends of the plug and the means confining the plug within the barrel.

2. An emulsifying or homogenizing apparatus comprising a barrel having an opening for the admission of liquid to the bore thereof, a hollow plug mounted in the bore of the barrel, means engaging the ends of the plug and confining the plug within the barrel under pressure, said plug having passages formed on the body of the plug for conducting the liquid to the ends of the plug where it is squeezed between the ends of the plug and the means confining the plug within the barrel.

3. An emulsifying or homogenizing apparatus comprising a barrel having a passage for conducting a flowing body of liquid thereto, and having a bore in connection therewith, a hollow plug mounted in the bore having the ends thereof smooth, a washer having smooth surfaces mounted upon an end of the plug, means for compressing the plug within the barrel, whereby the liquid will be forced or squeezed between the plug and washer to the bore of the plug.

4. An emulsifying or homogenizing apparatus comprising a barrel, a passage for conducting the flowing liquid and having a bore communicating therewith, a hollow plug mounted in the bore of the barrel having a well formed in each end thereof, and means for engaging the ends of the plug for securely holding the plug in the barrel for causing the liquid to be squeezed between the ends of the plug and the means for holding the plug in the barrel, and whereby the liquid passing over the ends of the plug will engage two flat surfaces of the plug at each end.

5. An emulsifying or homogenizing apparatus comprising a barrel having a passage for conducting the flowing liquid, and having a bore communicating with the passage, a hollow plug received within the bore of the barrel, means engaging an end of the plug for supporting it within the barrel, and means engaging the other end of the barrel for confining the plug within the barrel under pressure for causing the liquid to be squeezed between the ends of the plug and the supporting and confining means.

6. An emulsifying or homogenizing apparatus comprising a barrel having a bore therein, and a passage leading to the bore for conducting the flowing liquid to the bore, a hollow plug received within the bore of the barrel having a well formed at each end thereof, means for supporting the plug in the well, a washer mounted upon the other end of the barrel, and means engaging the uppermost surface of the washer for compressing the plug and washer between said supporting means and compressing means to cause the liquid to be squeezed between the supporting means and plug, and between the plug, washer and compressing means, said plug presenting two surfaces at each end to be engaged by the liquid passing over the ends of the plug.

7. An emulsifying or homogenizing apparatus, comprising a casing having a passage therethrough for the admission of the liquid to be treated, a device interposed in said passage, said device having two separated smooth surfaces, and pressure exerting means engaging and closing over said smooth surfaces, between which smooth surfaces and said pressure means, the material to be treated is forced on its way through the passage.

8. An emulsifying or homogenizing apparatus, comprising a barrel having a passage therethrough for the admission of the liquid to be treated, a device located in the passage having two separated smooth surfaces at one end, and pressure exerting means engaging and closing over said smooth surfaces, between which smooth surfaces and means, the material to be treated is forced on its way through the passage.

In testimony whereof I affix my signature, in the presence of two witnesses.

HENRY N. BRAWNER, Jr.

Witnesses:
 STUART E. OBERLIN,
 MILDRED M. F. LONG.